US010168425B2

(12) United States Patent
Bilik et al.

(10) Patent No.: US 10,168,425 B2
(45) Date of Patent: Jan. 1, 2019

(54) CENTRALIZED VEHICLE RADAR METHODS AND SYSTEMS

(71) Applicant: GM GLOBAL TECHNOLOGY OPERATIONS LLC, Detroit, MI (US)

(72) Inventors: Igal Bilik, Rehovot (IL); Ran Y. Gazit, Ra'Anana (IL)

(73) Assignee: GM Global Technology Operations LLC, Detroit, MI (US)

( * ) Notice: Subject to any disclaimer, the term of this patent is extended or adjusted under 35 U.S.C. 154(b) by 343 days.

(21) Appl. No.: 14/754,357

(22) Filed: Jun. 29, 2015

(65) Prior Publication Data

US 2018/0074191 A1 Mar. 15, 2018

Related U.S. Application Data

(60) Provisional application No. 62/020,623, filed on Jul. 3, 2014.

(51) Int. Cl.
*G01S 13/88* (2006.01)
*G01S 13/93* (2006.01)
(Continued)

(52) U.S. Cl.
CPC .............. *G01S 13/88* (2013.01); *G01S 7/003* (2013.01); *G01S 13/87* (2013.01); *G01S 13/93* (2013.01);
(Continued)

(58) Field of Classification Search
CPC ........ G01S 13/88; G01S 13/93; G01S 13/931; G01S 13/885; G01S 7/021; G01S 13/86; G01S 5/0247; G01S 15/931; B63C 1/04
See application file for complete search history.

(56) References Cited

U.S. PATENT DOCUMENTS 3,264,644 A * 8/1966 Jacob ...................... G01S 13/86
3,290,677 A * 12/1966 Jacob ...................... G01S 13/86
(Continued)

FOREIGN PATENT DOCUMENTS

CN 1898961 A 1/2007
CN 101395492 A 3/2009
(Continued)

OTHER PUBLICATIONS

State Intellectual Property Office of the People's Republic of China, Office Action in Chinese Patent Application No. 201510516261.3 dated Jul. 3, 2017.
(Continued)

*Primary Examiner* — Bernarr E Gregory
(74) *Attorney, Agent, or Firm* — Lorenz & Kopf, LLP

(57) ABSTRACT

Methods and systems are provided for a radar system. The radar system comprises a plurality of distributed radar units and a centralized radar processing unit. The plurality of distributed radar units are each configured to obtain respective radar signals. Each of the plurality of distributed radar units are disposed at a different respective location of a mobile platform. The centralized radar processing unit is disposed within the mobile platform, coupled to each of the plurality of distributed radar units, and configured to directly process the radar signals from each of the plurality of distributed radar units.

10 Claims, 5 Drawing Sheets

(51) Int. Cl.
*G01S 7/00* (2006.01)
*G01S 13/87* (2006.01)
*G01S 13/00* (2006.01)

(52) U.S. Cl.
CPC ..... *G01S 13/931* (2013.01); *G01S 2013/9371* (2013.01)

(56) References Cited

U.S. PATENT DOCUMENTS

| | | | | |
|---|---|---|---|---|
| 3,772,693 | A * | 11/1973 | Allard et al. | G01S 5/0247 |
| 4,203,113 | A * | 5/1980 | Baghdady | G01S 13/931 342/418 |
| 4,700,191 | A * | 10/1987 | Manor | G01S 7/021 |
| 5,087,918 | A * | 2/1992 | May et al. | G01S 13/931 |
| 5,124,713 | A | 6/1992 | Mayes et al. | |
| 5,543,386 | A | 8/1996 | Findikoglu et al. | |
| 5,610,620 | A | 3/1997 | Stites et al. | |
| 5,631,446 | A | 5/1997 | Quan | |
| 5,592,170 | A * | 7/1997 | Price et al. | G01S 13/885 |
| 5,689,216 | A | 11/1997 | Sturdivant | |
| 5,835,054 | A * | 11/1998 | Warhus et al. | G01S 13/885 |
| 5,973,648 | A | 10/1999 | Lindenmeier et al. | |
| 5,999,092 | A * | 12/1999 | Smith et al. | G01S 13/931 |
| 6,032,054 | A | 2/2000 | Schwinke | |
| 6,037,860 | A * | 3/2000 | Zander | G01S 13/931 307/10.1 |
| 6,211,831 | B1 | 4/2001 | Nagy et al. | |
| 6,219,002 | B1 | 4/2001 | Lim | |
| 6,366,249 | B1 | 4/2002 | Jones et al. | |
| 6,417,747 | B1 | 7/2002 | Dearden et al. | |
| 6,424,300 | B1 | 7/2002 | Sanford et al. | |
| 6,617,943 | B1 | 9/2003 | Fazelpour | |
| 6,728,113 | B1 | 4/2004 | Knight et al. | |
| 6,677,889 | B2 * | 7/2004 | Van Rees et al. | B63C 1/04 |
| 6,765,574 | B1 | 7/2004 | Mao et al. | |
| 6,795,741 | B2 | 9/2004 | Simon | |
| 6,847,276 | B2 | 1/2005 | Tamaki et al. | |
| 6,853,337 | B2 | 2/2005 | Barabash | |
| 6,861,991 | B2 | 3/2005 | Mueller et al. | |
| 7,015,860 | B2 | 3/2006 | Alsliety | |
| 7,053,845 | B1 | 5/2006 | Holloway et al. | |
| 7,079,082 | B2 | 7/2006 | Iskander et al. | |
| 7,233,296 | B2 | 6/2007 | Song et al. | |
| 7,248,153 | B2 * | 7/2007 | Danz | G01S 15/931 340/435 |
| 7,342,547 | B2 | 3/2008 | Maniwa et al. | |
| 7,369,041 | B2 | 5/2008 | Nakanishi et al. | |
| 7,427,961 | B2 | 9/2008 | Song et al. | |
| 7,710,325 | B2 | 5/2010 | Cheng | |
| 8,098,205 | B2 | 7/2012 | Rabinovich et al. | |
| 8,350,638 | B2 | 1/2013 | White et al. | |
| 8,686,906 | B2 | 4/2014 | White et al. | |
| 8,704,719 | B2 | 4/2014 | Song et al. | |
| 2003/0103010 | A1 | 6/2003 | Boyle | |
| 2003/0201929 | A1 * | 10/2003 | Lutter | G01S 13/931 342/52 |
| 2004/0051659 | A1 * | 3/2004 | Garrison | G01S 13/931 |
| 2005/0219136 | A1 | 10/2005 | Iskander et al. | |
| 2008/0042903 | A1 | 2/2008 | Cheng | |
| 2009/0009399 | A1 | 1/2009 | Gaucher et al. | |
| 2009/0212993 | A1 | 8/2009 | Tsunekawa et al. | |
| 2009/0289852 | A1 | 11/2009 | Li et al. | |
| 2010/0164790 | A1 | 7/2010 | Wisnewski et al. | |
| 2011/0018656 | A1 | 1/2011 | Lee et al. | |
| 2011/0037656 | A1 | 2/2011 | Bremner et al. | |

FOREIGN PATENT DOCUMENTS

| | | |
|---|---|---|
| CN | 201804112 U | 4/2011 |
| CN | 102187376 A | 9/2011 |
| CN | 103204121 A | 7/2013 |
| JP | 2013195086 A | 9/2013 |

OTHER PUBLICATIONS

Hopf, J. F. et al. "Compact Multi-antenna System for Cars with Electrically Invisible Phone Antennas for SDARS Frequencies," 2nd International ITG Conference on Antennas, Mar. 2007, pp. 171-175.

Chiu, C-Y., et al. "Reduction of Mutual Coupling Between Closely-Packed Antenna Elements," IEEE Transactions on Antennas and Propagation, Jun. 2007, pp. 1732-1738, vol. 55, No. 6.

Andersen, J., et al. "Decoupling and Descattering Networks for Antennas," IEEE Transactions on Antennas and Propagation, Nov. 1976, pp. 841-846, vol. 24, No. 6.

Houdart, M., et al. "Various Excitation of Coplanar Waveguide," IEEE MTT-S International Microwave Symposium Digest, Apr. 1979, pp. 116-118, vol. 79, No. 1.

Lin, T.-H. "Via-free broadband microstrip to CPW transition," IEEE Electronic Letters, Jul. 19, 2001, pp. 960-961, vol. 37, No. 15.

Ellis, T.J., et al. "A wideband CPW-to-microstrip transition for millimeter-wave packaging," IEEE MTT-S International Microwave Symposium Digest, 1999, pp. 629-632, vol. 2.

Waterhouse, R.B., et al. "Small Folded CPW Fed Slot Antennas," IEEE Antennas and Propagation Society International Symposium, Jul. 2006, pp. 2599-2602.

Jan, J.-Y., et al. "Wideband CPW-fed Slot Antenna for DCS, PCS, 3G and Bluetooth Bands," IEEE Electronics Letters, Nov. 23, 2006, pp. 1377-1378, vol. 42, No. 24.

Sze, J.-Y., et al., "Circularly Polarized Square Slot Antenna With a Pair of Inverterd-L Grounded Strips," IEEE Antennas and Wireless Propagation Letters, 2008, pp. 149-151, vol. 7.

Bao, X., et al., "Dual-Frequency Dual-Sense Circularly-Polarized Slot Antenna Fed by Microstrip Line," IEEE Transactions on Antennas and Propagation, Mar. 2008, pp. 645-649, vol. 56, No. 3.

Song, H.J., et al. "Antenna System and Filter," U.S. Appl. No. 12/886,322, filed Sep. 20, 2010.

Chen, C., et al., "Dual-band dual-sense circularly-polarized CPW-fed slot antenna with two spiral slots loaded," IEEE Transactions on Antennas and Propagation, Jun. 2009, pp. 1829-1833, vol. 57, No. 6.

Robert A. Sainati, CAD of Microstrip for Wireless Applications, ISBN 0-89006-562-4, 1996, pp. 29-30 and 92-94.

State Intellectual Property Office of the People's Republic of China, Office Action in Chinese Patent Application No. 201510516261.3 dated Aug. 30, 2018.

* cited by examiner

CENTRALIZED VEHICLE RADAR METHODS AND SYSTEMS

CROSS-REFERENCE TO RELATED APPLICATIONS

This application claims the benefit of U.S. Provisional Application No. 62/020,623, filed Jul. 3, 2014, the entirety of which is hereby incorporated by reference herein.

TECHNICAL FIELD

The present disclosure generally relates to radar systems, and more particularly relates to centralized radar systems for use with mobile platforms.

BACKGROUND

Certain mobile platforms, such as buses, motorcycles, trains, marine vessels, robots, aircraft, rotorcraft and the like, today utilize radar systems. For example, certain mobile platforms utilize radar systems to detect other mobile platforms, pedestrians, or other objects on a path or road in which the mobile platform (e.g. vehicle) is travelling. Radar systems may be used in this manner, for example, in implementing automatic braking systems, adaptive cruise control, and avoidance features, among other features. Some mobile platforms include multiple stand alone radar systems providing different fields of view. While such radar systems are generally useful, in certain situations existing radar systems may have certain limitations.

Accordingly, it is desirable to provide techniques for radar system performance in mobile platforms, for example that include different multiple fields of view. It is also desirable to provide methods, systems, and mobile platforms utilizing such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a radar system is provided. The radar system comprises a plurality of distributed radar units and a centralized radar processing unit. Each of the plurality of distributed radar units configured to obtain respective radar signals. Each of the plurality of distributed radar units disposed at a different respective location of the mobile platform. The centralized radar processing unit is disposed within the mobile platform, coupled to each of the plurality of distributed radar units, and configured to directly process the radar signals from each of the plurality of distributed radar units.

In accordance with an exemplary embodiment, a method for controlling a radar system is provided. The method comprises obtaining a plurality of radar signals from each of a plurality of distributed radar units, each of the plurality of distributed radar units is disposed at a different respective location of a mobile platform, and directly processing the plurality of radar signals from each of the plurality of distributed radar units via a centralized radar processing unit that is disposed within the vehicle and coupled to each of the plurality of distributed radar units.

DESCRIPTION OF THE DRAWINGS

The present disclosure will hereinafter be described in conjunction with the following drawing figures, wherein like numerals denote like elements, and wherein:

FIG. 1 is a functional block diagram of an exemplary mobile platform that includes a radar system having multiple distributed radar units and a centralized processing unit, in accordance with an exemplary embodiment, while

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
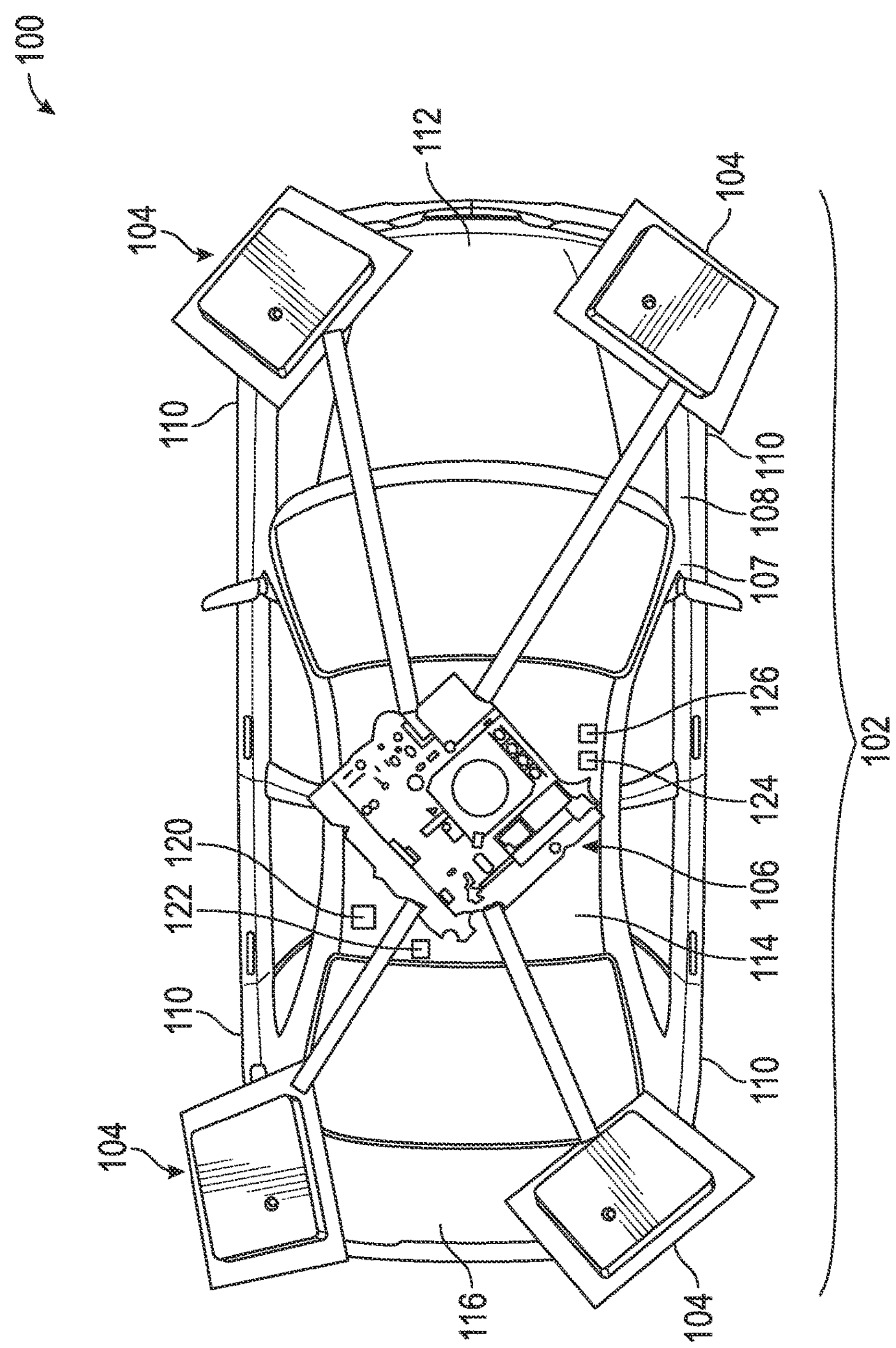
Figure 6:
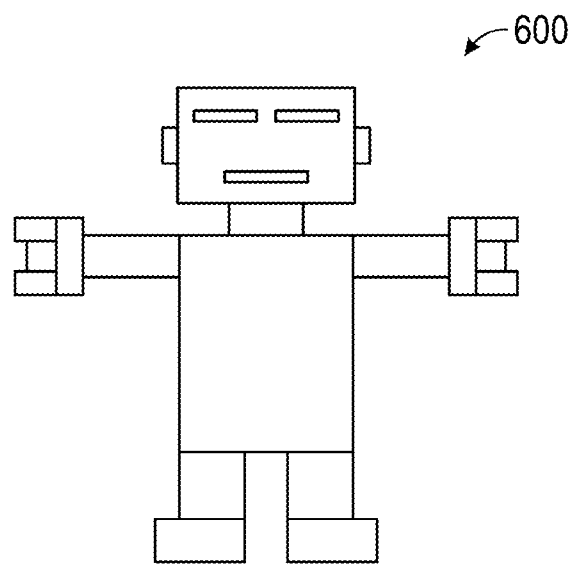
FIGS. 6 and 7 depict two other exemplary mobile platforms, in accordance with exemplary embodiments.
Figure 7:
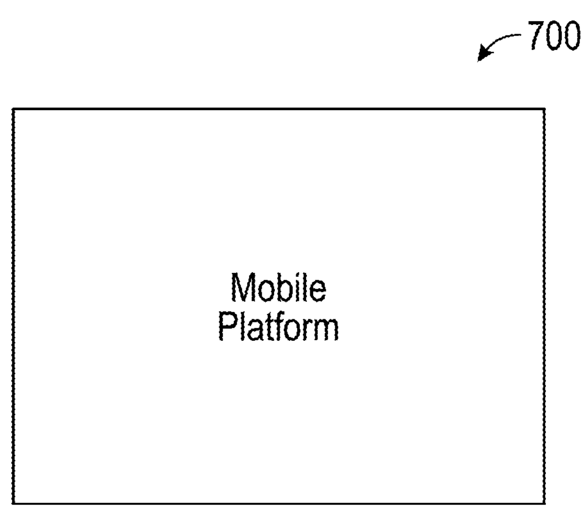

FIG. 1 illustrates a mobile platform having a radar system 102, according to an exemplary embodiment. In the example of FIG. 1, the exemplary mobile platform is a vehicle 100. It should be understood, however, that the various teachings of the present disclosure are not limited to a vehicle 100, but can be employed on any suitable mobile platform, such as buses, motorcycles, trains, marine vessels, robots, aircraft, rotorcraft and the like. For example, in various embodiments, the various teachings of the present disclosure can be employed in connection with a robot 600 of FIG. 6, one or more vehicular mobile platforms (e.g. vehicle 100 of FIG. 1), one or more non-vehicular mobile platforms (e.g. denoted generally as mobile platform 700 of FIG. 7), and/or one or more other various types of mobile platforms (including, without limitation, those noted above). As described in greater detail further below, in one embodiment the mobile platform (e.g. the vehicle 100) includes the radar system 102 that includes multiple distributed radar units 104 and a centralized processing unit 106. In one embodiment, the radar system 102 provides for streamlined identification and tracking of objects on or along a road in which the vehicle 100 is travelling by processing data from the distributed radar units 104 using the centralized processing unit 106 in accordance with the method 400 described further below in connection with FIG. 4.

With reference again to FIG. 1, the vehicle 100 includes, in addition to the above-referenced radar system 102, a chassis 107, a body 108, and four wheels 110. The body 108 is arranged on the chassis 107 and substantially encloses the other components of the vehicle 100. The body 108 and the chassis 107 may jointly form a frame. The body 108 may include various regions, such as the hood 112, roof 114, and trunk 116 regions depicted in FIG. 1. The wheels 110 are each rotationally coupled to the chassis 107 near a respective corner of the body 108.

In the exemplary embodiment illustrated in FIG. 1, the vehicle 100 also includes an actuator assembly 120, a steering system 122, a braking system 124, and an electronic control system 126. The actuator assembly 120 includes at least one propulsion system mounted on the chassis 107 that drives the wheels 110. In one embodiment, the actuator assembly 120 includes a combustion engine. In various embodiments, the engine may be coupled to the wheels 110 through one or more drive shafts (not depicted), to a transmission (not depicted), and/or to a generator (not depicted) used to power an electric motor that is mechanically coupled to the transmission. In other embodiments, the actuator assembly 120 may include one or more other types of engines and/or motors, such as an electric motor/generator, instead of or in addition to the combustion engine.

The steering system 122 is mounted on the chassis 107, and controls steering of the wheels 110. The steering system 122 includes a steering wheel and a steering column (not depicted). The steering wheel receives inputs from a driver of the vehicle 100. The steering column results in desired steering angles for the wheels 110 via the drive shafts based on the inputs from the driver as is generally known to those skilled in the art.

The braking system 124 is mounted on the chassis 107, and provides braking for the vehicle 100. The braking system 124 receives inputs from the driver via a brake pedal (not depicted), and provides appropriate braking via brake units (also not depicted). The driver also provides inputs via an accelerator pedal (not depicted) as to a desired speed or acceleration of the vehicle 100, as well as various other inputs for various vehicle devices and/or systems, such as one or more vehicle radios, other entertainment systems, environmental radar systems, lightning units, navigation systems, and the like (also not depicted).

The electronic control system 126 is also mounted on the chassis 107. The electronic control system 126 controls operation of various vehicle components, including various functions of the actuator assembly 120, the steering system 122, and the braking system 124. In one embodiment, the electronic control system 126 comprises a computer system comprising a processor, a memory, an interface, a bus, and a storage device (not depicted in FIG. 1).

As noted above, the radar system 102 includes multiple distributed radar units 104 and a centralized processing unit 106. The distributed radar units 104 are disposed at various locations around the body 108 that provide for different fields of view. Each of the distributed radar units 104 collect radar data, for example pertaining to objects detected on or around a road in which the vehicle 100 is travelling, from its respective field of view. In one embodiment, the distributed radar units 104 provide for about a three hundred sixty (360) degree field of view via strategic placement of the distributed radar units 104.

In the exemplary embodiment depicted in FIG. 1, one radar unit 104 is disposed on a driver's side of the front hood 112 region, one radar unit 104 is disposed on a passenger's side of the front hood 112 region, one radar unit 104 is disposed on a driver's side of the trunk 116 region, and one radar unit 104 is disposed on a passenger's side of the trunk 116 region. It will be appreciated that the number of radar units 104 may vary in different embodiments. For example, in certain embodiments, more than five distributed radar units 104 may be implemented. It will similarly be appreciated that the placement of the distributed radar units 104 may vary in different embodiments, for example in that radar units 104 may be disposed on or around the roof 114, bumpers, windows, and/or doors of the vehicle 100. In various other types of mobile platforms, the distributed units 104 may similarly be disposed at various locations of the mobile platform, such as one or more decks, hulls, rooftops, a lookout areas, wings, tails, and/or various other locations of buses, buses, motorcycles, trains, marine vessels, robots, aircraft, rotorcraft, and/or other mobile platforms.

Figure 2:
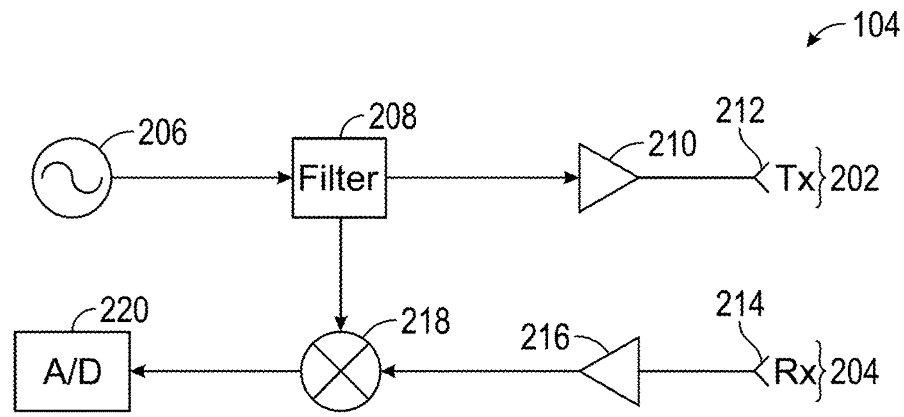
FIG. 2 is a functional block diagram of one of the distributed radar units of FIG. 1, in accordance with an exemplary embodiment.

FIG. 2 provides a functional block diagram of one of the distributed radar units 104 of FIG. 1, in accordance with an exemplary embodiment. In the depicted embodiment, the distributed radar unit 104 includes a transmitter 202 (also referred to herein as a transmitting channel) and a receiver 204 (also referred to herein as a receiving channel). The transmitter 202 transmits radar signals from the distributed radar unit 104. After the transmitted radar signals contact one or more objects on or near a path or road on which the vehicle 100 is travelling and is reflected/redirected toward the distributed radar unit 104, the redirected radar signals are received by the receiver 204 of the distributed radar unit 104 for processing.

With further reference to FIG. 2, the transmitting channel 202 includes a signal generator 206, a filter 208, an amplifier 210, and an antenna 212. The receiving channel 204 includes an antenna 214, an amplifier 216, a mixer 218, and a sampler/digitizer 220. In certain embodiments the antennas 212, 214 may comprise as single antenna, while in other embodiments the antennas 212, 214 may comprise separate antennas. Similarly, in certain embodiments the amplifiers 210, 216 may comprise a single amplifier, while in other embodiments the amplifiers 210, 216 may comprise separate amplifiers.

The distributed radar unit 104 generates the transmittal radar signals via the signal generator 206. The transmittal radar signals are filtered via the filter 208, amplified via the amplifier 210, and transmitted from the multiple distributed radar units 104 (and from the vehicle 100, also referred to herein as the "vehicle") via the antenna 212. In one embodiment, the transmitting radar signals subsequently intercept other vehicles and/or other objects on or alongside the road or path on which the vehicle 100 is travelling. After contacting the other vehicles and/or other objects, the radar signals are reflected, and travel from the other vehicles and/or other objects in various directions, including some signals returning toward the vehicle 100. The radar signals returning to the vehicle 100 (also referred to herein as received radar signals) are received by the antenna 214, amplified by the amplifier 216, mixed by the mixer 218, and digitized by the sampler/digitizer 220. The received radar signals are then provided to the centralized processing unit 106 of FIG. 1 for processing. In one embodiment, multiple distributed radar units 104 each transmit multiple signals simultaneously and receive multiple echoes, which are then provided to the central processing unit 106. Also in one embodiment, the central processing unit 106 combines these multiple echoes for multiple sensors and interprets the multiple echoes.

Returning to FIG. 1, the centralized processing unit 106 (also referred to herein as a centralized radar processing unit) is coupled to each and all of the distributed radar units 104. In one embodiment, the centralized processing unit 106 is disposed in a separate housing from each of the plurality of distributed radar units 104 and that is remote from each of the plurality of distributed radar units 104. In one embodiment, the centralized processing unit 106 receives raw-measurements from all distributed sensors (e.g., the distributed units 104) that observe the scene from different perspectives, and uses the collected measurements to create a reliable representation of the scene. In one embodiment, the centralized processing unit 106 is directly coupled to each of the respective sampler/digitizers 220 of the distributed radar units 104. In one embodiment, the centralized processing unit 106 uses the raw data, for example samples from the plurality of sensors of the distributed radar units 104, for the processing required for the target detection, its location estimation and tracking (in contrast to typical systems, in which the merging is performed on the object-level, after the local processing is done, on which the local decisions were made). Also in one embodiment, the centralized processing unit 110 comprises a dedicated processor for the centralized radar system 102, with its processing functionality used exclusively for the centralized radar system 102. In one embodiment, the centralized processing unit 106 is hard wired to each of the distributed radar units 104. In another embodiment, the centralized processing unit 106 is wirelessly coupled to each of the distributed radar units 104. In yet other embodiments, the centralized processing unit 106 is hard wired one or more of the distributed radar units 104 and wirelessly coupled to one or more other distributed radar units 104.

The centralized processing unit 106 obtains the radar data from each of the distributed radar units 104 and processes the radar data from each of the distributed radar units 104 together, for example for identifying and tracking objects on or along the road in which the vehicle 100 is travelling. In so doing, the centralized processing unit 106 utilizes the different points of view from the different distributed radar units 104 along with the different measurement capabilities at different points in time for a streamlined processing of information pertaining to objects that are detected by the distributed radar units 104 on or around a road in which the vehicle 100 is travelling. For example, if an object of interest is detected by one or more distributed radar units 104 at the front of the vehicle 100 (e.g. on the front hood 112 region) at a first point in time in which the object is in front of the vehicle 100, and is subsequently detected by one or more distributed radar units 104 at the rear of the vehicle 100 (e.g. on the trunk 116 region or from the bumper of the vehicle 100) at a second point in time in which the object is behind the vehicle 100, the centralized processing unit 106 processes the information from the various distributed radar units 104 together in a streamlined manner to detect and track the object.

Accordingly, the use of the centralized processing unit 106 can take advantage of the different points of view of the different distributed radar units 104 at different points of time. In certain embodiments, the combination of these diverse measurements allows for the improvement of the probability of accurate target detection, and to reduction in the possibility of false alarms. The use of the centralized processing unit 106 can also leverage any differences in capabilities of the different distributed radar units 104. In certain embodiments, the centralized processing unit 106 provides for increased reliability of target classification. In addition, weight and costs may also be reduced for the vehicle 100 by the use of the single, centralized processing unit 106. Moreover, the use of the centralized processing unit 106 can also alleviate mutual interferences and reduce overall system resources loss for the vehicle 100, for example by synchronization between transmissions of various sensor and coordination between transmitted waveforms. In one embodiment, the information at the centralized processing unit 106 can be used for targets detection, localization and classification. Also in one embodiment, the operation between distributed unis 104 is cooperative in the sense that they can be used to forma distributed MIMO (multi-input-multi-output) radar, where all units transmit orthogonal waveforms and all receive them; or bi-static radar when one signal transmitted form of unit is received. In addition, in one embodiment, host vehicle dynamics can be used to inference scene from one sensor into the scene of other sensor. For example, in one embodiment, the scene that the front looking sensor observes at a first time (time t0) is the scene that the side or back facing sensor will observe at a second, subsequent time (time t0+dt).

In one embodiment, the centralized processing unit 106 comprises a computer system that is disposed within the body 108 of the vehicle 100, on the chassis 107, generally at a central location between each of the distributed radar units 104. In one such embodiment, the centralized processing unit 106 comprises a dedicated computer system for the centralized radar system 102. In other embodiments, the centralized processing unit 106 may comprise, in whole or in part, and/or be coupled to one or more other computer systems of the vehicle 100, such as, by way of example, the electronic control system (ECS) 126 of FIG. 1.

Figure 3:
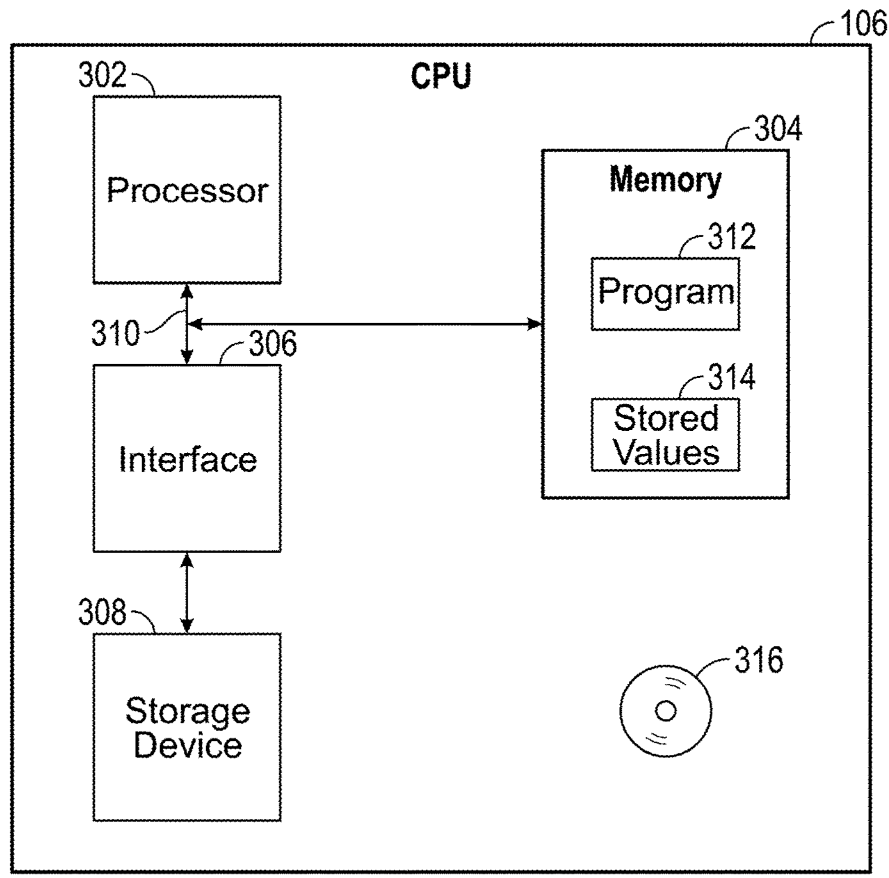
FIG. 3 is a functional block diagram of the centralized processing unit of FIG. 1, in accordance with an exemplary embodiment.

FIG. 3 provides a functional block diagram of a portion of the centralized radar system 102 of FIG. 1, including centralized processing unit 106, in accordance with an exemplary embodiment. In the depicted embodiment, the centralized processing unit 106 comprises a computer system that includes a processor 302, a memory 304, an interface 306, a storage device 308, and a bus 310. The processor 302 performs the computation and control functions of the centralized processing unit 106, and may comprise any type of processor or multiple processors, single integrated circuits such as a microprocessor, or any suitable number of integrated circuit devices and/or circuit boards working in cooperation to accomplish the functions of a processing unit. During operation, the processor 302 executes one or more programs 312 contained within the memory 304 and, as such, controls the general operation of the centralized processing unit 106, generally in executing the processes described herein, such as the method 400 described further below in connection with FIG. 4.

The memory 304 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 304 is located on and/or co-located on the same computer chip as the processor 302. In the depicted embodiment, the memory 304 stores the above-referenced program 312 along with one or more stored values 314 for use in making the determinations.

The bus 310 serves to transmit programs, data, status and other information or signals between the various components of the computer system of the centralized processing unit 106. The interface 306 allows communication to the computer system of the centralized processing unit 106, for example from a system driver and/or another computer system, and can be implemented using any suitable method and apparatus. In one embodiment, the interface 306 obtains the radar data from the distributed radar units 104 of FIG. 1. The interface 306 can include one or more network interfaces to communicate with other systems or components. The interface 306 may also include one or more network interfaces to communicate with technicians, and/or one or more storage interfaces to connect to storage apparatuses, such as the storage device 308.

The storage device 308 can be any suitable type of storage apparatus, including direct access storage devices such as hard disk drives, flash systems, floppy disk drives and optical disk drives. In one exemplary embodiment, the storage device 308 comprises a program product from which memory 304 can receive a program 312 that executes one or more embodiments of one or more processes of the present disclosure, such as the method 400 (and any sub-processes thereof) described further below in connection with FIG. 4. In another exemplary embodiment, the program product may be directly stored in and/or otherwise accessed by the memory 304 and/or a disk (e.g., disk 316), such as that referenced below.

The bus 310 can be any suitable physical or logical means of connecting computer systems and components. This includes, but is not limited to, direct hard-wired connections, fiber optics, infrared and wireless bus technologies. During operation, the program 312 is stored in the memory 304 and executed by the processor 302.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 302) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the centralized processing unit 106 may also otherwise differ from the embodiment depicted in FIG. 3 for example in that the computer system of the centralized processing unit 106 may be coupled to or may otherwise utilize one or more remote computer systems and/or other radar systems.

Figure 4:
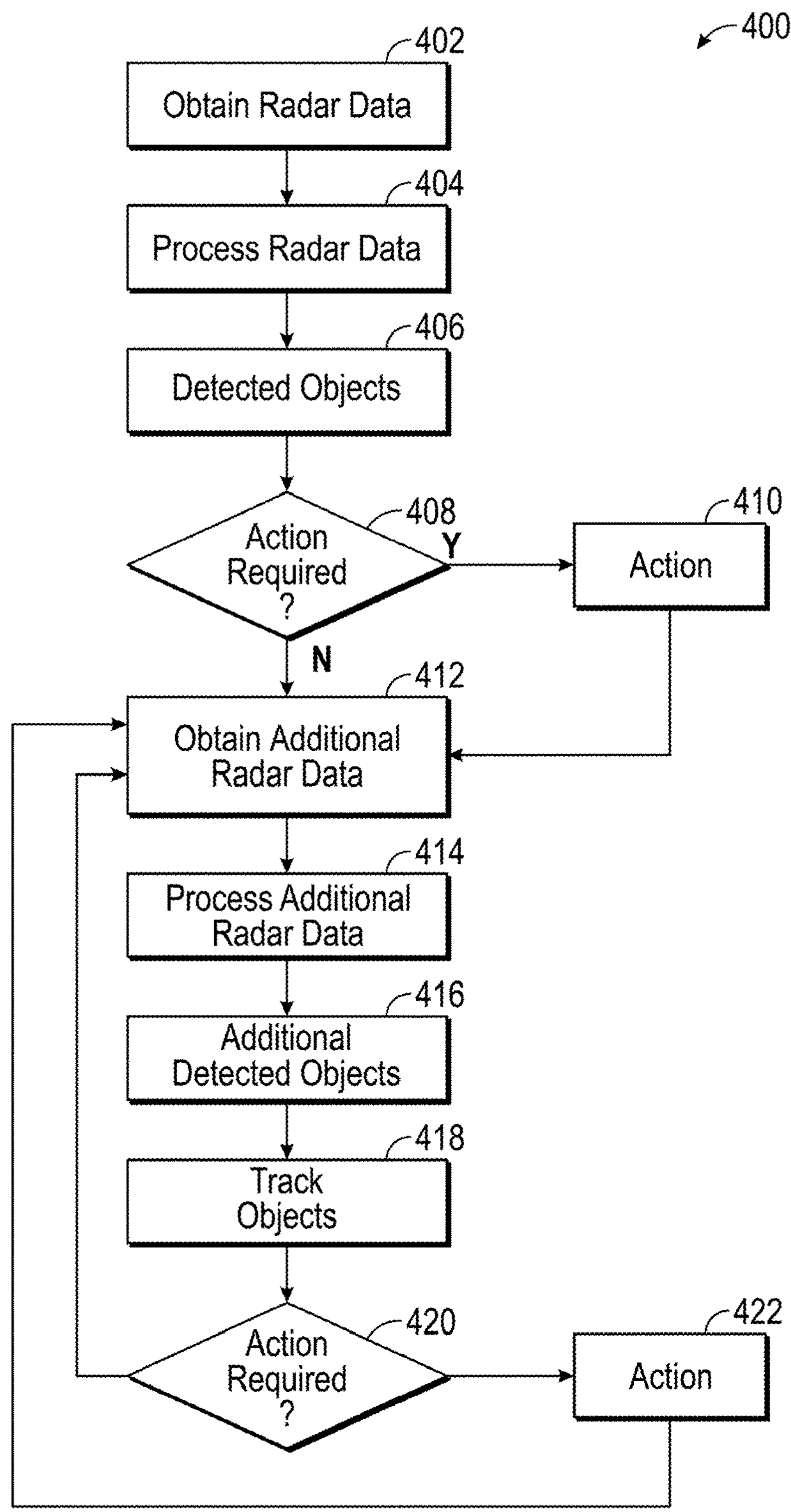
FIG. 4 is a flowchart of a method for implementing a radar system, and that can be implemented in connection with the mobile platform of FIG. 1 and the radar system of FIGS. 1-3, and/or the mobile platforms of FIGS. 6 and/or 7, in accordance with an exemplary embodiment.

FIG. 4 is a flowchart of a method 400 for implementing a radar system of a vehicle, in accordance with an exemplary embodiment. The method 400 can be implemented in connection with the vehicle 100 of FIG. 1 and the centralized radar system 102 (including the distributed radar units 104 and the centralized processing unit 106 thereof) of FIGS. 1-3, in accordance with an exemplary embodiment. In one embodiment, the method 400 runs continuously throughout the operation of the vehicle 100. In various other embodiments, the method 400 can be employed with any number of different types of mobile platforms, including those discussed above in connection with FIGS. 1, 6, and 7.

As depicted in FIG. 4, the method 400 includes obtaining radar data at 402. Specifically, in one embodiment, during 402, radar data is obtained at a first point in time from each of the distributed radar units 104 of FIG. 1. Accordingly, radar data is represented from each of the respective fields of view of the respective distributed radar units 104 at the first point in time. The radar data from each of the respective distributed units 104 is provided, substantially simultaneously or nearly simultaneously, to the centralized processing unit 106 of FIG. 1 for processing.

In one embodiment, for each of the distributed radar units 104, radar signals are transmitted via the transmitting channel 202 of FIG. 2 of the respective distributed radar unit 104. The transmitted radar signals are transmitted from the vehicle 100 as the vehicle 100 is travelling along a path or road, and are reflected from objects on or around the road. By way of example, an object may comprise a moving object (such as another vehicle, a pedestrian, or an animal) or a fixed object (such as a tree, a tree branch, a parked vehicle, debris on or along the road), or so on. After the radar signals are reflected from objects on or around the path or road, return radar signals are received by the distributed radar unit 104 via the receiving channel 204 of FIG. 2.

Centralized processing is performed for the radar data from the various distributed radar units 104 at 404. In one embodiment, the data from the various distributed radar units 104 are processed substantially simultaneously, or nearly simultaneously, to identify objects on or along the road in which the vehicle 100 is travelling. Accordingly, in one embodiment, objects are identified in 404 using data from a first point in time from various fields of view surrounding the vehicle 100 (each particular distributed radar unit 104 representing a respective different field of view). In one embodiment, 404 is performed by the centralized processing unit 106 of FIGS. 1 and 3, specifically by the processor 302 thereof.

As part of the centralized processing, at 406, determinations are made regarding the detected objects on or around the road in which the vehicle 100 is travelling. In one embodiment, the determinations are made as to the type of objects on or along the road, and/or the location, placement, shape, size, and/or other dimensions thereof, using the radar data. In one embodiment, geographic coordinates and physical measurements (e.g., length, width, height) of the objects are determined, along with the objects' proximity to and/or movement with respect to the vehicle 100, using the radar data. In one embodiment, the determinations of 406 are made using conventional radar processing approaches. In one embodiment, the determinations of 406 are performed by the centralized processing unit 106 of FIGS. 1 and 3, specifically by the processor 302 thereof.

At 408, a determination is made as to whether a vehicle action is required. In one embodiment, the determination pertains to whether a vehicle action is required for avoidance of another vehicle, a pedestrian, and/or another object. In one embodiment, the determination of 408 is made using the radar data of 402, the centralized processing of 404, and the determinations of 406. Specifically, in one embodiment, a vehicle action may be required if a distance between the vehicle 100 and the object is less than a predetermined threshold or an estimated time of contact between the vehicle 100 and the object is less than a predetermined threshold (e.g. based on the positions, velocities, and/or accelerations of the vehicle 100 and the object using techniques known in the art). In one embodiment, the determination of 408 is performed by the centralized processing unit 106 of FIGS. 1 and 3, specifically by the processor 302 thereof. If a determination is made in 408 that an action is not necessary, then the method proceeds directly to 412, described further below.

Conversely, if a determination is made in 408 that an action is necessary, then the action is taken at 410. In certain embodiments, the action comprises an alert, such as a visual or audio alert to the driver. In addition, in certain embodiments, the action comprises an automatic vehicle control action, such as initiation of automatic braking and/or automatic steering. Also in one embodiment, the action is initiated by the centralized processing unit 106 outputting one or more control signals to an appropriate vehicle system, such as the steering system 122 and/or the braking system 124 of FIG. 1 and/or an alert unit (not depicted) of the vehicle 100 of FIG. 1. In one embodiment, the actions are initiated by the centralized processing unit 106 of FIGS. 1 and 3, specifically by the processor 302 thereof. The method proceeds to 412, described directly below.

During 412, additional radar data is obtained. Specifically, in one embodiment, during 412, radar data is obtained at a second point in time (subsequent to the first point in time of 402) from each of the distributed radar units 104 of FIG. 1. Accordingly, radar data is represented from each of the respective fields of view of the respective distributed radar units 104 at the second point in time. The radar data from each of the respective distributed units 104 is provided, substantially simultaneously or nearly simultaneously, to the centralized processing unit 106 of FIG. 1 for processing. In one embodiment, for each of the distributed radar units 104, radar signals are transmitted via the transmitting channel 202 of FIG. 2 of the respective distributed radar unit 104 similar to the manner described above in connection with 402.

Centralized processing is performed for the additional radar data from the various distributed radar units 104 at 414. In one embodiment, the additional data from the various distributed radar units 104 (and their respective fields of view) at the second point of time of 412 are processed substantially simultaneously, or nearly simultaneously, to identify objects on or along the path or road in which the vehicle 100 is travelling, in a similar manner described above in connection with 404. In one embodiment, 414 is performed by the centralized processing unit 106 of FIGS. 1 and 3, specifically by the processor 302 thereof.

As part of the centralized processing, at 416, additional determinations are made regarding the detected objects on or around the road in which the vehicle 100 is travelling. In one embodiment, the determinations are made as to the type of objects on or along the path or road, and/or the location, placement, shape, size, and/or other dimensions thereof, using the additional radar data, similar to the manner described above in connection with 406. In one embodiment, the determinations of 406 are performed by the centralized processing unit 106 of FIGS. 1 and 3, specifically by the processor 302 thereof.

Also as part of the centralized processing, the detected objects are tracked at 418. Specifically, the detected objects are tracked using the determinations of 406 and 416 in combination with one another. In one embodiment, the position and movement of the object is tracked over time using the radar data from 402, the additional radar data from 412, the centralized processing of 404 and 414, and the determinations of 406 and 416, to thereby provide more accurate and precise tracking of the object(s). In one embodiment, 418 is performed by the centralized processing unit 106 of FIGS. 1 and 3, specifically by the processor 302 thereof.

For example, if an object of interest is detected by one or more distributed radar units 104 at the front of the vehicle 100 (e.g. on the front hood 112 region) at the first point in time in 402 when the object is in front of the vehicle 100, and is subsequently detected by one or more distributed radar units 104 at the rear of the vehicle 100 (e.g. on the trunk 116 region or proximate the bumper of the vehicle 100) at the second point in time in 412 when the object is behind the vehicle 100, the object can be tracked using data from fields of view both behind and in front of the vehicle 100 at different points of time, to help provide for improved tracking of the object. By way of additional example, if an object of interest is detected by one or more distributed radar units 104 on the driver's side of the vehicle 100 at the first point in time in 402 when the object is to the left of the vehicle, and is subsequently detected by one or more distributed radar units 104 on the passenger's side of the vehicle 100 at the second point in time in 412 when the object is to the right of the vehicle 100, the object can be tracked using data from fields of view both the driver's side and passenger's side of the vehicle 100 (or from both the front and rear side of the vehicle 100) at different points of time, to help provide for improved tracking of the object, and so on.

Figure 5A:
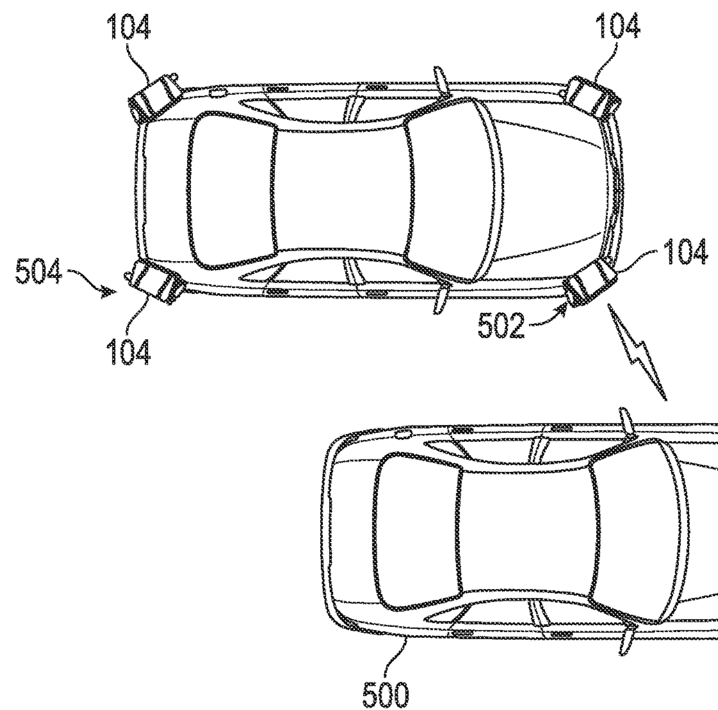
FIGS. 5A and 5B provide illustrations of the detection of an object by distributed radar units at different locations on the mobile platform at different points in time, utilizing the radar system of FIGS. 1-3 and the method of FIG. 4, in accordance with an exemplary embodiment.
Figure 5B:
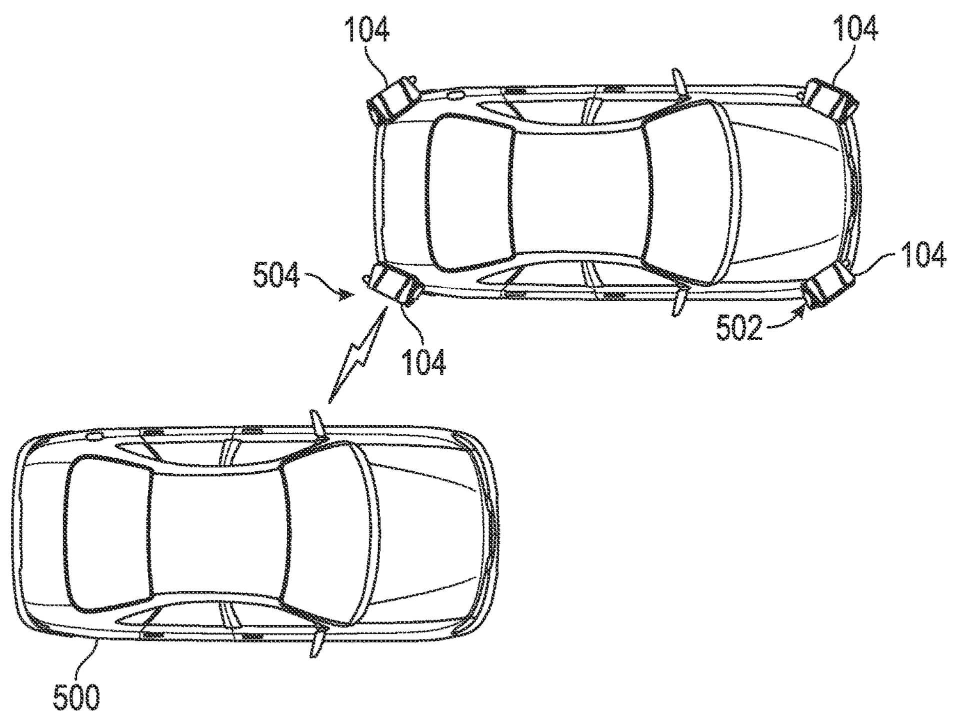

For example, with reference to FIGS. 5A and 5B, in one embodiment an object 500 (e.g., another vehicle) is detected by one of the radar units 104 proximate a front, passenger's side corner 502 of the vehicle 100 at a first point in time (time $t_0$) as shown in FIG. 5A. Also in this embodiment, the object 500 (e.g., another vehicle) is detected by a different one of the radar units 104 proximate a rear, passenger's side corner 504 of the vehicle 100 at a second point in time (time $t_1$) as shown in FIG. 5B as the vehicle 100 moves forward relative to the object 500 (e.g. the other vehicle) (e.g., as the vehicle 100 moves faster in the forward direction than the object 500). It will similarly be appreciated that the order of the detection in the example of FIG. 5A and FIG. 5B could be reversed in certain examples, for example if the object 500 is moving forward relative to the vehicle 100 (e.g., if the object 500 is moving faster in the forward direction than is the vehicle 100). It will similarly be appreciated that the detection could occur first proximate the passenger's side of the vehicle (i.e., at the first time) and subsequently proximate the driver's side of the vehicle (i.e., at the second time) (or vice versa), for example if the object 500 is moving in a substantially perpendicular direction with respect to the vehicle 100.

At 420, a determination is made as to whether a vehicle action is required. In one embodiment, the determination pertains to whether a vehicle action is required for avoidance of another vehicle, a pedestrian, and/or another object based on the additional radar data. In one embodiment, the determination of 420 is made using the radar data of 402, the additional radar data from 412, the centralized processing of 404 and 414, the determinations of 406 and 416, and the tracking of 418. Specifically, based on this information, in one embodiment, a vehicle action may be required if a distance between the vehicle 100 and the object is less than a predetermined threshold or an estimated time of contact between the vehicle 100 and the object is less than a predetermined threshold. In one embodiment, the determination of 420 is performed by the centralized processing unit 106 of FIGS. 1 and 3, specifically by the processor 302 thereof.

If a determination is made in 420 that an action is necessary, then the action is taken at 422. Similar to 410 discussed above, in certain embodiments, the action comprises an alert (such as a visual or audio alert to the driver) and/or an automatic vehicle control action (such as initiation of automatic braking and/or automatic steering). Also similar to 410, in one embodiment, the action is initiated by a processor outputting one or more control signals to an appropriate vehicle system, such as the steering system 122 and/or the braking system 124 of FIG. 1 and/or an alert unit (not depicted) of the vehicle 100 of FIG. 1. In one embodiment, the acts are initiated by the centralized processing unit 106 of FIGS. 1 and 3, specifically by the processor 302 thereof.

Conversely, if a determination is made in 420 that an action is not necessary, then an action is not taken. Regardless of whether an action is taken, the method proceeds to 412, as new additional data is obtained from the distributed radar units 104 at a new subsequent time (e.g. a third point in time that is subsequent to the above-referenced second point of time of the prior iteration). Steps 412-422 thereafter repeat, substantially continuously, with new iterations at new points in time while the vehicle 100 of FIG. 1 is in operation during a current vehicle drive or ignition cycle.

Accordingly, a centralized radar system 102 for a vehicle 100 is provided, along with a method 400 for implementing a centralized radar system 102 for a vehicle 100. The centralized radar system 102 includes a plurality of distributed radar units 104 and a centralized processing unit 106. The distributed radar units 104 obtain radar data at various fields of view surrounding the vehicle 100. The centralized processing unit 106 processes the radar data from the various distributed radar units 104 in a streamlined manner for use in identifying, classifying, and tracking objects on or around the road in which the vehicle 100 is travelling. As a result, the systems, methods, and vehicles disclosed herein are able to exploit the diversity of multiple measurements from the different distributed radar units 104 at the different points of view. In addition, the disclosed systems, methods, and vehicles can help to reduce processing power, alleviate mutual interferences, and reduce overall system resources loss via the use of the central processing unit 106 for the multiple distributed radar units 104.

It will be appreciated that the disclosed methods, systems, and vehicles may vary from those depicted in the Figures and described herein. For example, the vehicle 100, the centralized radar system 102, the distributed radar units 104, the centralized processing unit 106, and/or various components thereof may vary from that depicted in FIGS. 1-3 and described in connection therewith. By way of further example, the disclosed methods and systems may be utilized in connection with various different types of mobile platforms, such as buses, motorcycles, trains, marine vessels, robots, aircraft, rotorcraft and the like, for example, as discussed above in connection with FIGS. 1, 6, and 7. In addition, it will be appreciated that certain steps of the method 400 may vary from those depicted in FIG. 4 and/or described above in connection therewith. It will similarly be appreciated that certain steps of the method 400 described above may occur simultaneously or in a different order than that depicted in FIG. 4 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A radar system for a mobile platform, comprising:

a plurality of distributed radar units, each of the plurality of distributed radar units configured to obtain respective radar signals, each of the plurality of distributed radar units disposed at a different respective location of the mobile platform; and a centralized radar processing unit disposed within the mobile platform, coupled to each of the plurality of distributed radar units, and configured to directly process the radar signals from each of the plurality of distributed radar units;

wherein:

the mobile platform comprises an automotive vehicle that includes a hood and a trunk;

at least one of the plurality of distributed radar units is disposed on the hood;

at least another of the plurality of distributed radar units is disposed on the trunk;

a first one of the plurality of distributed radar units is disposed on a passenger side of the hood;

a second one of the plurality of distributed radar units is disposed on a driver side of the hood;

a third one of the plurality of distributed radar units is disposed on a passenger side of the trunk; and a fourth one of the plurality of distributed radar units is disposed on a driver side of the trunk.

2. The radar system of claim 1, wherein the centralized radar processing unit is disposed in a separate housing from each of the plurality of distributed radar units and that is remote from each of the plurality of distributed radar units.

3. The radar system of claim 1, wherein each of the plurality of distributed radar units comprises a transmitter and a receiver, and wherein each of the plurality of distributed radar units does not comprise a processor.

4. The radar system of claim 1, wherein each of the plurality of distributed radar units comprises an antenna and a digitizer that is directly coupled to the centralized radar processing unit.

5. The radar system of claim 4, wherein each of the plurality of distributed radar units further comprises a filter, an amplifier, and a mixer.

6. The radar system of claim 1, wherein the centralized radar processing unit is a dedicated processor for the radar control system.

7. The radar system of claim 1, wherein each of the plurality of distributed radar units is wired to the centralized radar processing unit.

8. The radar system of claim 1, wherein each of the plurality of distributed radar units is wirelessly coupled to the centralized radar processing unit.

9. The radar system of claim 1, wherein the plurality of distributed radar units provide a three hundred and sixty (360) degree field of view.

10. A mobile platform comprising:

a body comprising a front portion of the mobile platform and a rear portion of the mobile platform;

a plurality of distributed radar units configured around the body of the mobile platform, each of the plurality of distributed radar units configured to obtain respective radar signals, each of the plurality of distributed radar units disposed at a different respective location of the mobile platform, at least one of the plurality of distributed radar units disposed on the front portion of the mobile platform and at least one of the plurality of distributed radar units disposed on the rear portion of the mobile platform; and a centralized radar processing unit disposed inside the body, the centralized radar processing unit coupled to each of the plurality of distributed radar units, and configured to directly process the radar signals from each of the plurality of distributed radar units;

wherein:

the mobile platform comprises an automotive vehicle that includes a hood and a trunk;

at least one of the plurality of distributed radar units is disposed on the hood;

at least another of the plurality of distributed radar units is disposed on the trunk;

a first one of the plurality of distributed radar units is disposed on a passenger side of the hood;

a second one of the plurality of distributed radar units is disposed on a driver side of the hood;

a third one of the plurality of distributed radar units is disposed on a passenger side of the trunk; and a fourth one of the plurality of distributed radar units is disposed on a driver side of the trunk.

* * * * *